(12) United States Patent
Fabre

(10) Patent No.: US 9,617,012 B2
(45) Date of Patent: Apr. 11, 2017

(54) METHOD AND DEVICE FOR AUTOMATIC PROTECTION OF AN AIRCRAFT AGAINST A RISK OF COLLISION WITH THE GROUND

(71) Applicant: Airbus Operations (SAS), Toulouse (FR)

(72) Inventor: Pierre Fabre, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 29 days.

(21) Appl. No.: 14/844,404

(22) Filed: Sep. 3, 2015

(65) Prior Publication Data
US 2016/0070263 A1   Mar. 10, 2016

(30) Foreign Application Priority Data
Sep. 8, 2014  (FR) ...................... 14 58376

(51) Int. Cl.
| | | |
|---|---|---|
| *G05D 1/00* | (2006.01) | |
| *G05D 1/04* | (2006.01) | |
| *B64D 45/04* | (2006.01) | |
| *G05D 1/06* | (2006.01) | |
| *G01C 5/00* | (2006.01) | |

(52) U.S. Cl.
CPC .......... *B64D 45/04* (2013.01); *G05D 1/0676* (2013.01); *G01C 5/005* (2013.01)

(58) Field of Classification Search
CPC ....... G01C 5/005; G05D 1/0676; B64D 45/04
USPC .................................... 701/4, 7, 8
See application file for complete search history.

(56) References Cited

U.S. PATENT DOCUMENTS

| | | | |
|---|---|---|---|
| 4,419,079 A  * | 12/1983 | Georges .............. | G05D 1/0676 340/973 |
| 5,864,307 A | 1/1999 | Henley | |
| 9,058,040 B2 * | 6/2015 | Blechen .............. | G05D 1/0623 |
| 2006/0290531 A1 | 12/2006 | Reynolds et al. | |
| 2007/0185652 A1 | 8/2007 | Salmon et al. | |

(Continued)

FOREIGN PATENT DOCUMENTS

| | | |
|---|---|---|
| EP | 0790487 | 8/1997 |
| EP | 1859428 | 1/2010 |
| FR | 2986876 | 8/2013 |

OTHER PUBLICATIONS

French Search Report, May 29, 2015.

*Primary Examiner* — Atul Trivedi
(74) *Attorney, Agent, or Firm* — Greer, Burns & Crain Ltd.

(57) ABSTRACT

A protection device including a unit for implementing a protection function that prevents the aircraft from flying under a given height with respect to the ground. The device includes a unit for determining the current values of parameters, and at least the current position of the aircraft and a current heading deviation of the aircraft with respect to a landing strip. A calculation unit is provided for calculating, during a landing on the landing strip, from data including said current values, a current longitudinal distance defined in the horizontal plane and necessary for bringing the aircraft into a position for deactivating the protection function. A checking unit is provided for checking whether a condition dependent on the current longitudinal distance is met, the protection function being automatically deactivated if the checking unit concludes that this condition is met.

10 Claims, 4 Drawing Sheets

(56) References Cited

U.S. PATENT DOCUMENTS

| | | |
|---|---|---|
| 2008/0215195 A1 | 9/2008 | Jourdan et al. |
| 2010/0042273 A1 | 2/2010 | Meunier et al. |
| 2010/0305781 A1* | 12/2010 | Felix .................. G05D 1/101 701/3 |
| 2012/0158220 A1* | 6/2012 | Accardo ............. G05D 1/0646 701/15 |
| 2013/0211632 A1 | 8/2013 | Caule et al. |

* cited by examiner

METHOD AND DEVICE FOR AUTOMATIC PROTECTION OF AN AIRCRAFT AGAINST A RISK OF COLLISION WITH THE GROUND

CROSS-REFERENCES TO RELATED APPLICATIONS

This application claims the benefit of the French patent application No. 1458376 filed on Sep. 8, 2014, the entire disclosures of which are incorporated herein by way of reference.

BACKGROUND OF THE INVENTION

The present invention relates to a method and a device for automatic protection of an aircraft against a risk of collision with the ground, this method and this device using a protection function that prevents an aircraft from colliding with the ground.

Patent FR 2 986 876 describes an automatic method for protecting an aircraft, in particular a transport airplane, against a risk of collision with the overflown terrain. This method implements automatic protection, called GCoP (for 'Ground Collision Protection'), which uses a prohibited flight envelope and which prevents the aircraft from touching the ground under certain conditions. More precisely, this automatic protection prevents the aircraft from flying under a given height with respect to the ground (generally 200 or 250 feet).

As part of this GCoP protection, a non-operational and critical situation is considered that could lead to a CFIT collision (for 'Controlled Flight Into Terrain,' a term referring to a collision with the ground not following from a failure, or from a loss of control of the aircraft), and a prohibited flight envelope is used that avoids a collision with the ground. The prohibited flight envelope (defined by vertical speed and altitude pairs) can be determined from technical characteristics of the aircraft and the structure thereof.

When the aircraft is in a prohibited flight envelope, protection orders (overriding the authority of the pilot) are generated. These protection orders are aimed, in particular, at automatically controlling the control surfaces of the aircraft which act on the vertical speed of the aircraft. These protection orders are such that, when they are applied to these control surfaces, the aircraft emerges from the prohibited flight envelope.

Protection orders, which are applied as long as the GCoP protection function is activated (or enabled) and it is engaged (i.e., the aircraft has a vertical speed/altitude pair in the prohibited flight envelope), are used to progressively reduce the rate of descent of the aircraft until, for example, bringing it down to a zero vertical speed, thus preventing the aircraft from descending and therefore colliding with the overflown terrain.

When the conditions of engagement are no longer met, the GCoP protection function is disengaged and the crew regains its nominal authority, i.e., its commands are again taken into account and no longer the commands of the protection orders.

In the context of the present invention, it is considered that:

the protection function is activated (or enabled) if it is brought into a situation in which it is ready to automatically implement the protection provided, if particular conditions (of engagement) are met (in particular the aircraft entering a prohibited flight envelope). If it is not in this situation, it is considered to be deactivated so that the protection is not implemented even if the conditions of engagement are met; and the protection function is engaged, if it implements the protection provided, i.e., if it determines and applies the protection orders. Consequently, for being able to be engaged, the protection function must first be activated, then it is engaged (and provides protection) if particular conditions are met.

The GCoP protection function can be activated during a landing under certain conditions.

When the GCoP protection function has been activated, it is necessary to deactivate it in order to be able to perform the landing if the aircraft is in a situation allowing a landing, in particular if it regains a correct stabilized flight path toward the landing strip, for avoiding its engagement.

SUMMARY OF THE INVENTION

An object of the present invention is to determine the conditions for deactivating the protection function. It relates to a method of automatic protection of an aircraft against a risk of collision with the ground, said method including at least one main step comprising implementing on the aircraft at least one protection function, said protection function preventing the aircraft from flying under a given height with respect to the ground, and being capable of being activated and deactivated.

According to the invention, the method further includes a series of steps implemented automatically and repetitively, during a landing on a landing strip, at least when the protection function is activated, and comprising successively:

a) determining a plurality of data including the current values of parameters related to the flight of the aircraft, namely at least the current position of the aircraft and a current heading deviation of the aircraft with respect to the landing strip, as well as at least one target point;

b) calculating, from some of these data, a current longitudinal distance, this current longitudinal distance being defined in the horizontal plane and being necessary and sufficient for bringing the aircraft into a position for deactivating the protection function; and c) checking whether at least the following first condition is met:

$$XAC + D4 \cdot \text{sign}(\cos(\Delta\chi)) \geq XTGT$$

in which:

XAC illustrates a longitudinal coordinate of the current position of the aircraft, this longitudinal coordinate having a negative value and being defined along the longitudinal axis of the landing strip in the horizontal plane, with respect to a reference point;

sign represents the sign;

D4 is the current longitudinal distance, calculated in step b);

$\Delta\chi$ is the current heading deviation of the aircraft with respect to the landing strip; and XTGT is a longitudinal coordinate of a target position dependent on said target point, said method including an additional step comprising deactivating the protection function if at least said first condition is met.

Thus, thanks to the invention, it is checked whether the aircraft is located at a distance from a target position (linked to the landing strip), which is sufficient for enabling the aircraft to be brought into a position for which it can perform a landing. If the aircraft is in such a situation, the protection function is deactivated, so that the aircraft can no longer be prevented from approaching the ground by the protection function and is therefore able to land on the landing strip.

In a preferred embodiment, step c) also comprises checking whether the following second condition is met:

$$XAC < X2$$

in which X2 represents a maximum value of a target point, the protection function being deactivated as soon as said first and second conditions are simultaneously met.

Moreover, in one preferred embodiment, step b) includes substeps comprising:

b1) calculating a first distance D1 defined in the horizontal plane along the longitudinal axis of the landing strip and representing a minimum distance for which the protection function must be deactivated for an aligned flight;

b2) calculating a second distance D2 defined in the horizontal plane along the longitudinal axis of the landing strip and representing a distance required for the aircraft for directing its flight path toward the target point, from its current position and the current heading deviation;

b3) calculating a third distance D3 defined in the horizontal plane along the longitudinal axis of the landing strip and representing a distance required for the aircraft to be aligned in the axis of the landing strip with a close margin; and b4) calculating the current longitudinal distance D4 from these first, second and third distances, using the following expression, in which max represents the maximum value:

$$D4 = \max[0; D1 - (D2 + D3)].$$

Advantageously, substep b1) comprises calculating the first distance D1 using the following expression:

$$D1 = (k1 \cdot Z0 \cdot k2) \cdot k3$$

in which:
k1 is a predetermined margin;
k2 and k3 are predetermined parameters; and
Z0 is the lowest height at which the aircraft can fly if the protection function is engaged (generally 200 or 250 feet).

In addition, advantageously, the substep b2) comprises calculating the second distance D2 using the following expression:

$$D2 = V^2/(g \cdot tg(\phi 0)) \cdot |\sin(\Delta\chi) - \sin(\Delta\chi 1)|$$

in which:
V is the speed of the aircraft;
g is the acceleration of gravity;
tg is the tangent and sin the sine;
$\phi 0$ is a maximum bank angle of the aircraft;
$\Delta\chi$ is the current heading deviation of the aircraft with respect to the landing strip; and
$\Delta\chi 1$ is a heading deviation between the landing strip and a straight line passing through the current position of the aircraft and the target position.

Moreover, advantageously, substep b3) comprises calculating the third distance D3 using the following expression:

$$D3 = \max[0; V^2/(g \cdot tg(\phi 0)) \cdot (\sin(|\Delta\chi 1|) - \sin(\Delta\chi 0))]$$

in which, in addition to the aforementioned parameters, $\Delta\chi 0$ is a maximum heading deviation with respect to the landing strip for being able to perform a safe landing.

Furthermore, advantageously, the heading deviation $\Delta\chi 1$ between the landing strip and the straight line passing through the current position of the aircraft and the target position, is calculated using the following expressions:

$$\Delta\chi 1 = \text{arc } tg(YAC/(XTGT - XAC)) \text{ if } (XTGT - XAC) > 0;$$

$$\Delta\chi 1 = 180 + \text{arc } tg(YAC/(XTGT - XAC)) \text{ if } (XTGT - XAC) < 0 \text{ and } YAC > 0;$$

$$\Delta\chi 1 = -180 + \text{arc } tg(YAC/(XTGT - XAC)) \text{ if } (XTGT - XAC) < 0 \text{ and } YAC < 0$$

in which:
arc tg is the arc tangent; and
YAC illustrates a lateral coordinate of the current position of the aircraft in the horizontal plane.

Moreover, advantageously, the method includes an additional step comprises calculating the longitudinal coordinate XTGT of the target position so that:

this longitudinal coordinate XTGT of the target position is initially equal to the longitudinal coordinate X1 of the target point, as long as the longitudinal coordinate X1 of the target point remains greater than the sum of the longitudinal coordinate XAC of the current position of the aircraft and a predetermined minimum distance X min;

then, the longitudinal coordinate XTGT of the target position is equal to the sum of the longitudinal coordinate XAC of the current position of the aircraft and the minimum distance X min, as long as this longitudinal coordinate XTGT remains less than a predetermined maximum longitudinal coordinate X2.

The present invention also relates to a device for automatic protection of an aircraft against a risk of collision with the ground, said device including at least one main unit configured for implementing on the aircraft at least one protection function that prevents the aircraft from flying under a given height with respect to the ground, said main unit including an activation/deactivation element capable of activating and deactivating said protection function.

According to the invention, said device further includes:
a data generation unit configured for determining the current values of parameters related to the flight of the aircraft, namely at least the current position of the aircraft and a current heading deviation of the aircraft with respect to a landing strip;
a calculation unit configured for calculating, during a landing on the landing strip, from data including said current values and at least one target point, a current longitudinal distance defined in the horizontal plane and necessary for bringing the aircraft into a position for deactivating the protection function; and
a checking unit configured for checking whether at least the following first condition is met:

$$XAC + D4 \cdot \text{sign}(\cos(\Delta\chi)) > XTGT$$

in which:
XAC illustrates a longitudinal coordinate of the current position of the aircraft, this longitudinal coordinate having a negative value and being defined along the longitudinal axis of the landing strip in the horizontal plane, with respect to a reference point;
sign represents the sign;
D4 is the current longitudinal distance;
$\Delta\chi$ is the current heading deviation with respect to the landing strip; and
XTGT is a longitudinal coordinate of a target position dependent on said target point, the activation/deactivation element being configured for deactivating said protection function if the checking unit concludes that at least said first condition is met.

The present invention also relates to an aircraft, in particular a transport airplane, which is provided with a device such as that specified above.

BRIEF DESCRIPTION OF THE DRAWINGS

The accompanying figures will elucidate how the invention may be implemented. In these figures, identical references denote similar elements.

DETAILED DESCRIPTION OF THE PREFERRED EMBODIMENTS

Figure 1:
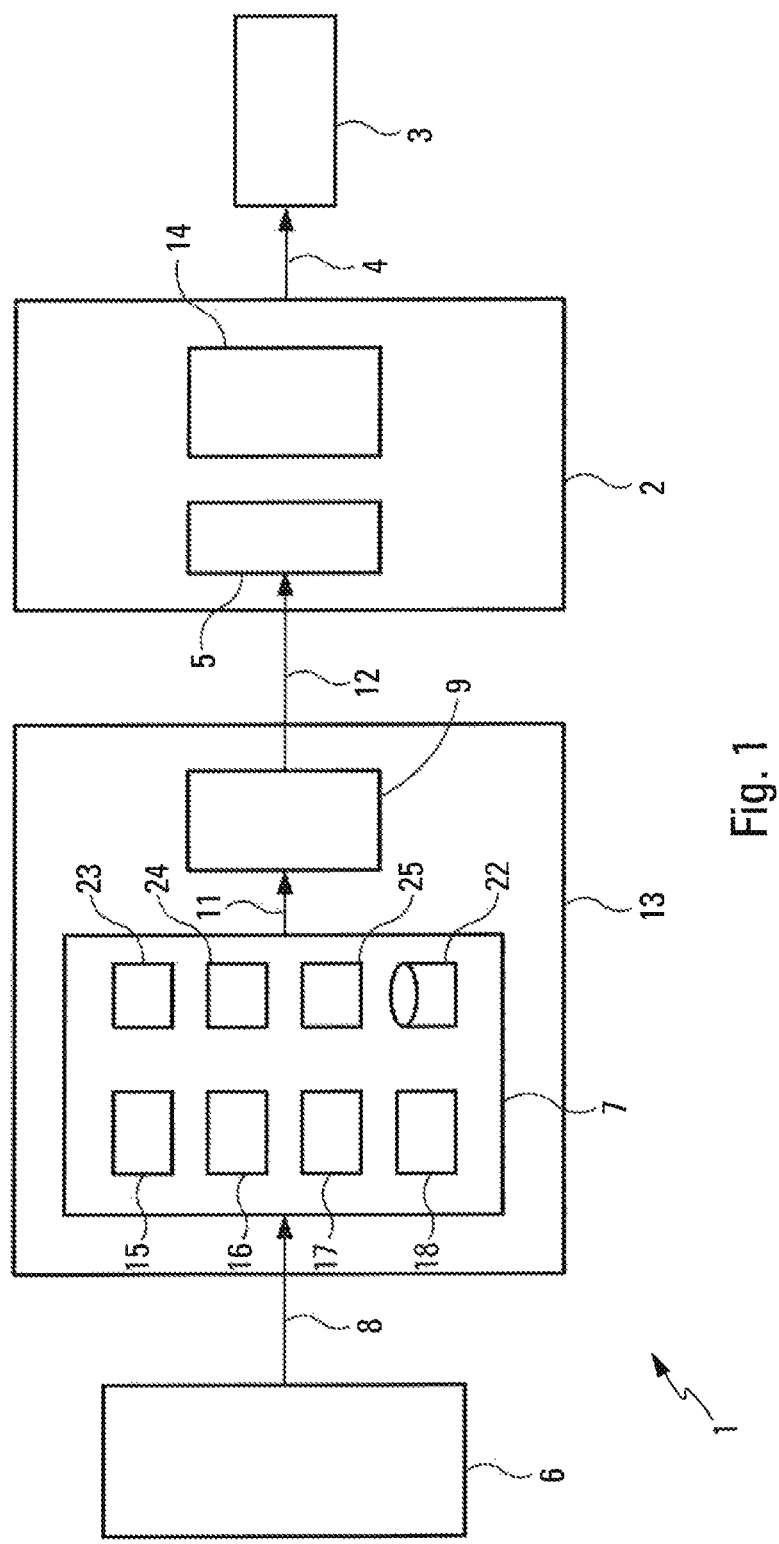
FIG. 1 is the block diagram of one particular embodiment of a device for automatic protection of an aircraft against a risk of collision with the ground.

In accordance with one embodiment of the present invention, FIG. 1 illustrates a dispenser, generally indicated at 2 and having a tip structure 4, for mixing at least two separate streams of components into a combined fluid stream, such as a sealant, or tissue sealant or other combined fluid stream. Although the dispensers, systems and methods are generally illustrated and described in the context of a tissue sealant dispenser, it is understood that the present invention is not limited to such a dispenser or to the mixing of tissue sealant components, and that the present invention has applications in a variety of settings where mixing of component fluid streams is desired As shown in FIG. 1, dispenser 2 includes at least two fluid component sources, illustrated in the form of hollow cylinders or barrels 6 and 8, although other source containers from which fluid components are provided may be used. In the embodiment of FIG. 1, each barrel 6, 8 has a generally cylindrical interior or bore in which one of the fluid components such as fibrinogen or thrombin for forming fibrin tissue sealant is stored. The distal end 7, 9, respectively, of each barrel has an outlet port 11, 13, respectively, for communicating with the dispensing tip structure, generally at 4.

The device 1 schematically represented in FIG. 1 and illustrating the invention, is a device for automatic protection of an aircraft against a risk of collision with the ground.

To do this, said device 1 includes a main unit 2 configured for implementing on the aircraft at least one protection function (e.g., of the GCoP type) which prevents the aircraft from flying under a given height with respect to the ground (e.g., 200 or 250 feet).

To do this, in a conventional manner, this main unit 2 includes in particular a calculation unit 14 configured for calculating protection orders that are transmitted to conventional means of actuation 3 of control surfaces (not represented) of the aircraft, as illustrated by a link 4 in FIG. 1.

These protection orders are such that, when they are applied to these control surfaces, the aircraft emerges where necessary from a prohibited flight envelope, which prevents it from touching the ground.

This main unit 2 is known and is not further described below. It may, for example, correspond to at least one portion of the system described in document FR 2 986 876 or to any other conventional unit of this type.

In addition, this main unit 2 includes an activation/deactivation element 5 capable of activating and deactivating said protection function.

As mentioned above:

the protection function is activated (or enabled) when it is brought into a situation in which it is ready to automatically implement the protection provided if particular conditions of engagement are met (in particular the aircraft entering a prohibited flight envelope). If it is not in this situation, it is considered to be deactivated so that the protection is not implemented even if the conditions of engagement are met;

the protection function is engaged, when it implements the protection, i.e., when the main unit 2 determines and applies the protection orders. Consequently, for being able to be engaged, the protection function must first be activated.

Figure 2:
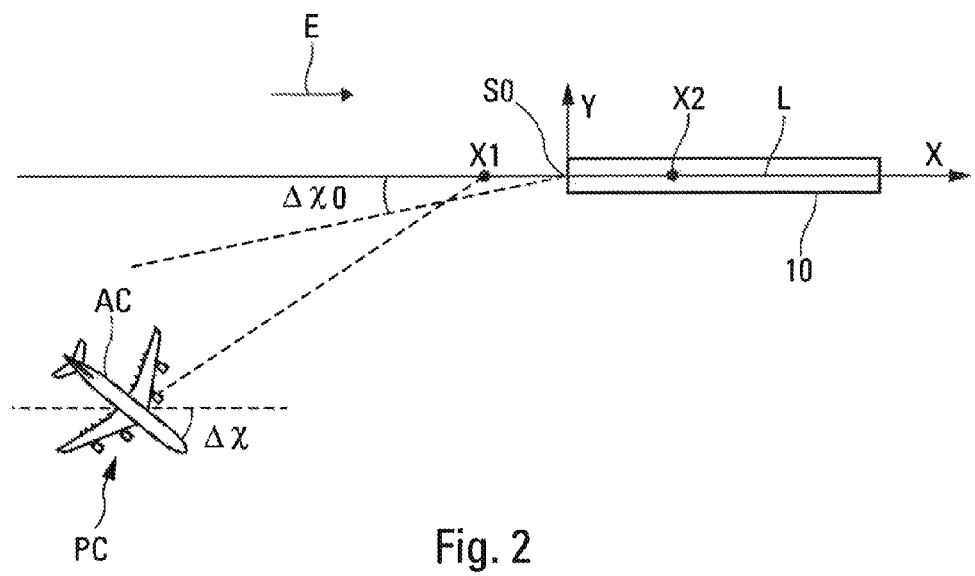
FIGS. 2 through 7 depict various schematic representations for illustrating the implementation of the invention and determining conditions for deactivating a protection function against a risk of collision with the ground.

It is assumed that the aircraft AC plans to land on a landing strip 10 with a longitudinal axis L of an airport, as represented in FIG. 2. In addition, the protection function implemented by the main unit 2 (or the main unit 2) is activated, but not engaged (the conditions of engagement not being met).

According to the invention, in order to deactivate the protection function (which is activated), said device 1 includes:

a data generation unit 6 comprising a set of conventional means, e.g., an inertial unit, which are capable of automatically determining, in a conventional manner, a plurality of current values of parameters related to the flight of the aircraft. The unit 6 determines, in particular, the current position of the aircraft AC and a current heading deviation of the aircraft AC with respect to the landing strip 10;

a calculation unit 7 connected via a link 8 to the unit 6 and configured for automatically calculating, during a landing on the landing strip 10, from some of these current values and from at least one target point, a current longitudinal distance D4 defined in the horizontal plane and necessary for bringing the aircraft AC into a position for deactivating the (previously activated) protection function; and a checking unit 9 connected via a link 11 to the calculation unit 7 and configured for automatically checking whether at least one first condition (of deactivation) is met.

More precisely, the checking unit 9 is configured for checking whether at least the following first condition (of deactivation) is met:

$$XAC + D4 \cdot \text{sign}(\cos(\Delta \chi)) \rangle XTGT$$

in which sign represents the sign.

In addition:

$\Delta \chi$ is the current heading deviation, i.e., the heading deviation at the current instant of the heading of the aircraft AC with respect to that of the axis L of the landing strip 10 of type QFU; and XTGT is a longitudinal coordinate of a target position dependent on said target point X1, as explained below.

Figure 3:
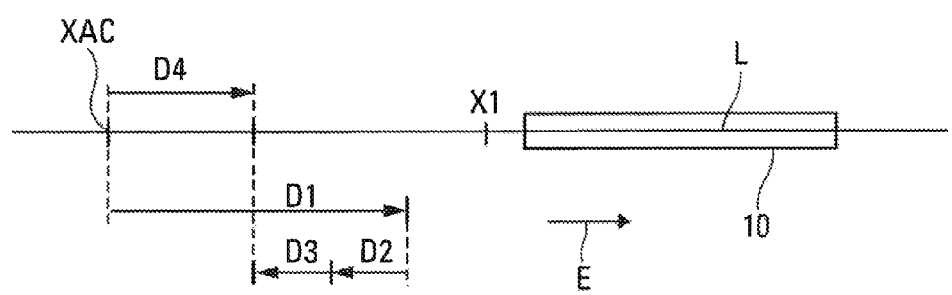

Furthermore, XAC illustrates a longitudinal coordinate of the current position PC of the aircraft AC (FIGS. 2 and 3). This longitudinal coordinate has a negative value and is defined along the longitudinal axis L of the landing strip 10 in the horizontal plane, with respect to a reference point, preferably the upstream threshold S0 of the strip 10 in the direction of flight (illustrated by an arrow E), as represented in FIG. 2.

The coordinates in the horizontal plane are defined in a reference system including, as represented in FIG. 2:
- a reference point located on the longitudinal axis L of the landing strip 10, preferably the upstream threshold S0,
- a first direction S0X defined along the longitudinal axis L in the direction of flight E, called the longitudinal direction. Values are considered positive downstream of the reference point and negative upstream thereof; and
- a second direction S0Y also defined in the horizontal (or lateral) plane and perpendicular to the longitudinal direction S0X. Values are considered positive in the direction indicated by S0Y beyond the reference point and negative in the opposite direction.

In addition, according to the invention, the element 5 is configured for deactivating the protection function, if the checking unit 9 informs it that at least the aforementioned first condition (of deactivation) is met.

As explained below, the calculation unit 7 of the device 1 calculates the distances used for implementing the invention, using the current values of the following parameters:
- V the speed of the aircraft AC;
- $\phi 0$ the maximum bank angle of the aircraft AC;
- $\Delta\chi$ the current heading deviation with respect to the landing strip 10 (QFU);
- (XAC,YAC) the current position PC of the aircraft AC;

The device 1 also uses the values of the following parameters, which may be stored in a memory 22:
- $\Delta\chi$ maximum heading deviation for a safe landing;
- Z0 a height of triggering (or engaging) the protection implemented by the protection function;
- X1 the target point on the landing strip 10;
- X min a minimum longitudinal distance between the aircraft AC and the target point; and
- X2 a maximum contact distance inside the landing strip 10 for being able to perform a safe landing.

In one particular embodiment, the calculation unit 7 and the checking unit 9 form part of a central unit 13. This central unit 13 may be external to the main unit 2 as represented in FIG. 1, or be integrated therein.

Figure 4:
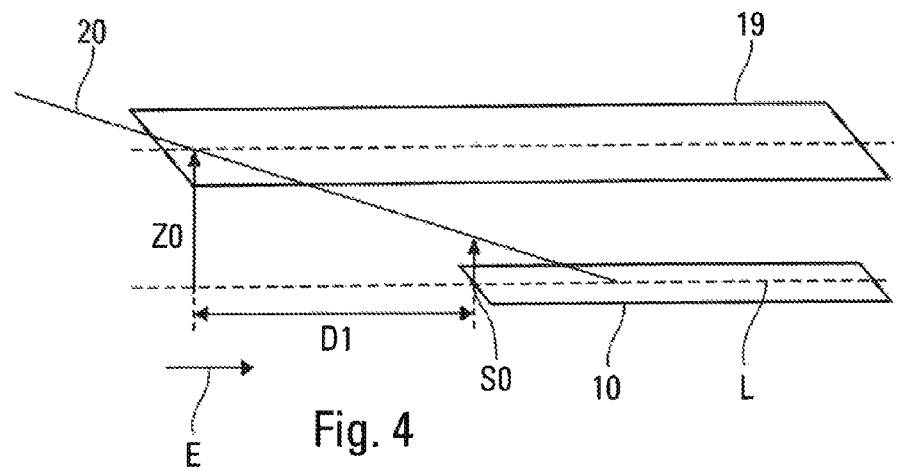

Furthermore, in a preferred embodiment, the calculation unit 7 comprises, as represented in FIG. 1:
- a calculation unit 15 for calculating a distance D1 defined in the horizontal plane along the longitudinal axis L of the landing strip 10 and representing a minimum distance for which the protection function must be deactivated for an aligned flight, as explained below with reference to FIG. 4;
- a calculation element 16 for calculating a distance D2 defined in the horizontal plane along the longitudinal axis L of the landing strip 10 and representing a distance required for the aircraft AC for directing its flight path toward the target point X1, from its current position PC and from the current heading deviation, as explained below with reference to FIG. 5;
- a calculation element 17 for calculating a distance D3 defined in the horizontal plane along the longitudinal axis L of the landing strip 10 and representing a distance required for the aircraft AC to be aligned in the axis L of the landing strip 10 with a close margin, as explained below with reference to FIGS. 5 and 6; and
- a calculation element 18 for calculating the current longitudinal distance D4 from these distances D1, D2 and D3, using the following expression, in which max represents the maximum value:

$$D4 = \max[0; D1-(D2+D3)].$$

The calculation of D4 using the distances D1, D2 and D3 is illustrated in FIG. 3, with respect to the longitudinal coordinate XAC.

A calculation of distance in the case of a straight flight is described below. If the aircraft is on a conventional landing axis 20 of the 'glide' type, forming, for example, an angle of 3° with the horizontal longitudinal axis L, as represented in FIG. 4, the protection function must be deactivated with a given margin, at a distance corresponding to a height above ground that is greater than the altitude Z0 (of engagement of the protection function).

Based on these considerations, the calculation element 15 calculates the distance D1 using the following expression:

$$D1 = (k1 \cdot Z0 - k2) \cdot k3$$

in which:
- k1 is a predetermined coefficient, greater than 1 for providing a margin on the deactivation distance;
- k2 and k3 are predetermined parameters; and
- Z0 is the height of triggering the protection implemented by the protection function and illustrated by a horizontal strip 19 in FIG. 4, below which the protection function prevents the aircraft AC from flying.

The distance D1 therefore corresponds to the longitudinal distance traveled by the aircraft AC along the longitudinal direction S0X when it flies from a height Z0 to overflying the landing strip 10 threshold S0 following a conventional landing path 20.

Preferably:
- k2=50; and
- k3=0.3048/tg3=5.81.

In a particular embodiment, a margin k1 is provided (for the theoretical altitude/distance conversion onto the 'glide' type path 20) of 50%, i.e., k1=0.5. D1=1452 meters are then obtained with Z0=200 feet.

Moreover, if the aircraft is not aligned with respect to the landing strip 10, it is necessary to wait for it to be so before disconnecting the protection.

Figure 5:
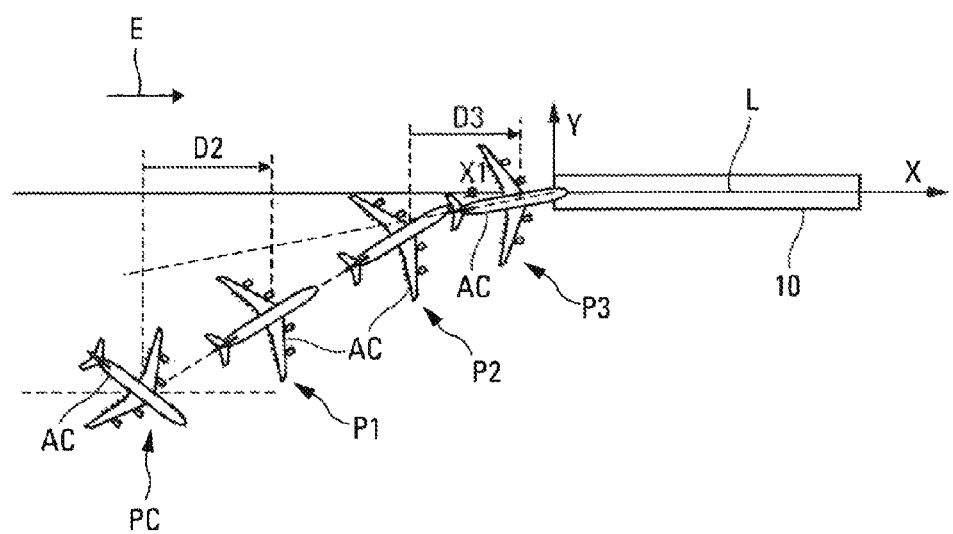

Thus, in the general case, for trying to regain a safe flight path toward the landing strip 10, the pilot must control (or pilot) the aircraft AC so as, as represented in FIG. 5:

1) to align the aircraft AC in the direction of the target point X1. For implementing this maneuver between the current position PC and an alignment position P1, the aircraft AC moves the distance D2 along the longitudinal axis L; and 2) to perform a lateral movement for aligning the flight path of the aircraft AC on the axis L of the landing strip 10 (with a maximum heading deviation of $\Delta\chi 0$, still considered as allowing a safe emergency landing). For implementing this maneuver between a position P2 and an alignment position P3, the aircraft AC moves the distance D3 along the longitudinal axis L.

The calculation element 16 calculates this distance D2 using the following expression:

$$D2 = V^2/(g \cdot tg(\phi 0)) \cdot |\sin(\Delta\chi) - \sin(\Delta\chi 1)|$$

in which, in addition to the aforementioned parameters:
- g is the acceleration of gravity;
- tg is the tangent and sin the sine; and
- $\Delta\chi 1$ is a heading deviation between the landing strip and a straight line passing through the current position of the aircraft AC and the target position.

In addition:
- $\phi 0$ is therefore the maximum bank angle of the aircraft AC; and $\Delta\chi$ is therefore the current heading deviation of the aircraft AC with respect to the landing strip 10 (FIG. 2).

Furthermore, the calculation element 17 calculates the distance D3 using the following expression:

$$D3 = \max[0; V^2/(g \cdot tg(\phi 0)) \cdot (\sin(|\Delta\chi 1|) - \sin(\Delta\chi 0))]$$

in which, $\Delta\chi$ is the maximum heading deviation with respect to the landing strip 10 for being able to perform a safe landing.

Figure 6:
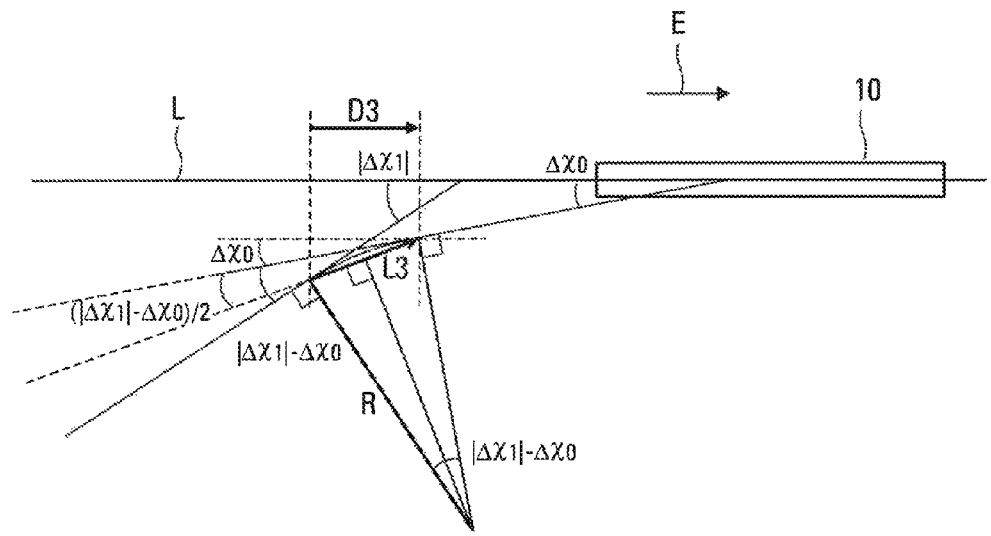

Indeed, the following relationships apply, as represented in FIG. 6:

$$D3 = L3 \cdot \cos((|\Delta\chi 1| - \Delta\chi 0)/2)$$

$$L3 = 2 \cdot R \cdot \sin((|\Delta\chi 1| + \Delta\chi 0)/2)$$

$$R = V^2/(g \cdot tg(\phi 0))$$

By integrating the expressions of L3 and R in D3, the following expression is obtained:

$$D3 = V^2/(g \cdot tg(\phi 0)) \cdot (\sin(|X\chi 1|) - \sin(\Delta\chi 0))$$

Of course, if the aircraft is already aligned, i.e., if $|\Delta\chi 1|$ $\langle \Delta\chi 0$, then it is considered that the distance D3 is zero. Thus ending up with the aforementioned expression.

For the implemented calculations, the calculation unit 7 therefore uses the following parameters:
- an initial value of the target point: X1;
- the maximum value of the target point: X2;
- the predetermined minimum longitudinal distance between the target point and the aircraft AC: X min;
- the maximum heading deviation for a safe landing in emergency situations: $\Delta\chi 0$;
- the maximum bank angle: $\phi 0$. This value is arbitrary. It indicates the maximum bank angle that a pilot will control at the maximum. This value may be determined empirically;
- the height of engagement of the protection function: Z0; and
- a margin for the theoretical altitude/distance conversion onto the 'glide' type landing path 20: k1.

It will be noted that two of the main parameters which have a significant impact on the protection function deactivation logic are the parameters $\phi 0$ and X min. $\phi 0$ may be interpreted as a gain on the course deviation (the smaller $\phi 0$ is, the greater the weight of the course deviation in the calculation of distances). Deactivation is implemented only for small course deviations, if $\phi 0$ is small. X min may be interpreted as a gain on the lateral deviation close to the strip (the smaller X min is, the greater the weight of the lateral deviation in the calculation of distances). Deactivation is implemented only for small lateral deviations, if X min is small.

In a particular embodiment, the various predetermined parameters used are recorded in the memory 22 which is, for example, integrated into the calculation unit 7, as represented in FIG. 1.

Deactivating the protection function based on the distance is only valid if the longitudinal coordinate of the aircraft XAC is significantly lower than X1 (target point). In this case, it is assumed that the pilot targets a constant point X1 before the landing strip 10, as the last point for succeeding in aligning the aircraft AC with the longitudinal (or central) axis L of the landing strip 10. If the urgency of the situation does not allow the pilot to implement this alignment and forces him to perform the final lateral alignment close to (or even after) this point X1, it is no longer valid. The pilot cannot fly the aircraft toward a point that might be behind it. Consequently, the target position XTGT is introduced as a reference point for providing an additional margin.

The device 1 calculates and uses this target position XTGT.

This target position is calculated as follows: it is initially equal to the value of the target point given X1, which is then corrected, in real time, so that XTGT is neither less than XAC+X min, nor more than X2.

Figure 7:
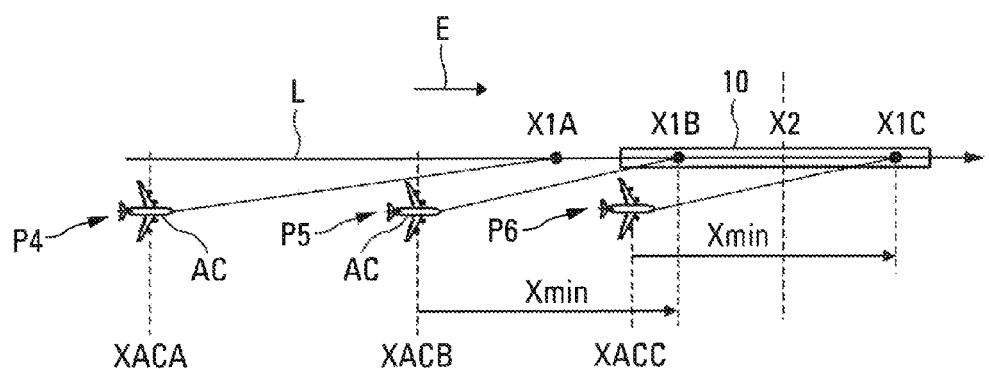

To do this, the calculation unit 7 includes a calculation element 24 for calculating the longitudinal coordinate XTGT of the target position as follows:
- this longitudinal coordinate XTGT of the target position is initially equal to the longitudinal coordinate X1 of the target point, as long as the longitudinal coordinate X1 of the target point remains greater than the sum of the longitudinal coordinate XAC of the current position of the aircraft AC and the predetermined minimum distance X min. This is the case for the longitudinal coordinate XACA of a first position P4 of the aircraft AC, as represented in FIG. 7. XTGT is then equal to X1 (represented at X1A in FIG. 7);
- then, the longitudinal coordinate XTGT of the target position is equal to the sum of the longitudinal coordinate XAC of the current position of the aircraft AC and the minimum distance X min. This is the case in FIG. 7, for the longitudinal coordinate XACB of a second position P5 of the aircraft AC. XTGT Is then equal to X1B;
- the longitudinal coordinate XTGT of the target position is equal to the sum of the longitudinal coordinate XAC of the current position of the aircraft AC and the minimum distance X min, as long as this longitudinal coordinate XTGT remains less than a predetermined maximum longitudinal coordinate X2. For the longitudinal coordinate XACC of a third position P6 of the aircraft AC (in FIG. 7), the coordinate X1C (X1C=XACC+X min) obtained then, is greater than X2 so that this coordinate X1C cannot be used for XTGT and the longitudinal coordinate XTGT can no longer be calculated (and the protection function cannot therefore be deactivated).

Furthermore, the calculation unit 7 also includes a calculation element 25 which calculates the heading deviation $\Delta\chi 1$ between the landing strip 10 (QFU) and the straight line passing through the current position PC of the aircraft AC and the target position, using the following expressions:

$$\Delta\chi 1 = \text{arc } tg(YAC/(XTGT-XAC)) \text{ if } (XTGT-XAC) \rangle 0.$$

$$\Delta\chi 1 = 180 + \text{arc } tg(YAC/(XTGT-XAC)) \text{ if } (XTGT-XAC)$$
$$\langle 0 \text{ and } YAC \rangle 0;$$

$$\Delta\chi 1 = -180 + \text{arc } tg(YAC/(XTGT-XAC)) \text{ if } (XTGT-XAC) \langle 0 \text{ and } YAC \langle 0,$$

in which:
- arc tg is the arc tangent; and
- YAC illustrates a lateral coordinate of the current position of the aircraft AC in the horizontal plane, along the axis SOY in FIG. 2.

Moreover, in a preferred embodiment, the checking unit 9 also checks whether the following second deactivation condition is met:

$$XAC \langle X2$$

in which X2 represents the maximum value of the target point.

In addition, the activation element 5 is configured for deactivating the protection function as soon as the checking unit 9 concludes that said first and second aforementioned deactivation conditions are simultaneously met.

In this preferred embodiment, the element 5 therefore deactivates the protection function (e.g., GCoP type) capable of being implemented by the main unit 2, if XAC+D4·sign(cos(Δχ)))XTGT and if XAC⟨X2.

More generally, the device 1 therefore provides for:
- acquiring the current position PC of the aircraft AC and the current heading deviation Δχ;
- calculating the location of the target point;
- calculating the heading deviation Δχ 1 between the landing strip 10 (QFU) and the straight line passing through the current position PC of the aircraft AC and the target position;
- calculating the distances D1, D2, and D3, then the distance D4; and
- checking whether the deactivation condition or conditions are met.

The operation of the device 1 as described above is as follows.

The protection function is activated on the aircraft AC. It will therefore be engaged and implemented in the conventional way by the main unit 2 of the device 1 as soon as the conditions of engagement are met.

In addition, the aircraft AC is considered in descent flight with a view to landing on a landing strip 10 of an airport (FIG. 2).

During this descent, units 6, 7 and 9 perform the aforementioned operations in real time and check whether the conditions for deactivating the protection function are met.

As soon as these deactivation conditions are met, the protection function is deactivated by the element 5 so that the protection is not implemented if the conditions of engagement are met later (particularly if the aircraft AC flies under the height Z0). In this case, the device 1 does not prevent the aircraft AC from landing. Landing may thus be performed in a conventional way, on the landing strip 10.

On the other hand, if the deactivation conditions are not met, i.e., If the aircraft AC is not in a situation of landing safely, the protection function remains activated, and it will prevent the aircraft from flying under the height Z0 as soon as the latter reaches this height Z0. In this case, the protection function implemented by the device 1 therefore prevents the landing.

Units 6, 7 and 9 in particular (of device 1) are therefore used to check whether the aircraft AC is able to land safely on a landing strip 10. This check is simple and uses parameters that are directly related to the maneuverability of the aircraft AC and to characteristics of the landing strip 10. It is thus easily adaptable to any landing strip.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of automatic protection of an aircraft against a risk of collision with the ground, comprising the steps:
   - implementing on the aircraft at least one protection function, said protection function preventing the aircraft from flying under a given height with respect to the ground, said protection function being capable of being activated and deactivated,
   - automatically and repetitively, during a landing on a landing strip, at least when the protection function is activated, performing the following successive steps:
   - determining a plurality of data including the current values of parameters related to the flight of the aircraft, namely at least the current position of the aircraft and a current heading deviation of the aircraft with respect to the landing strip, as well as at least one target point;
   - calculating, from some of these data, a current longitudinal distance, this current longitudinal distance being defined in the horizontal plane and being necessary and sufficient for bringing the aircraft into a position for deactivating the protection function; and
   - checking whether at least the following first condition is met:

$$XAC+D4\cdot\text{sign}(\cos(\Delta\chi))\_>\_XTGT$$

in which:
   XAC illustrates a longitudinal coordinate of the current position of the aircraft, this longitudinal coordinate having a negative value and being defined along a longitudinal axis of the landing strip in the horizontal plane, with respect to a reference point;
   sign represents the sign;
   D4 is the current longitudinal distance,
   Δχ is the current heading deviation of the aircraft with respect to the landing strip; and
   XTGT is a longitudinal coordinate of a target position dependent on said target point,
   said method including an additional step comprising deactivating the protection function if at least said first condition is met.

2. The method as claimed in claim 1, wherein the step of checking also comprises checking whether the following second condition is met:

$$XAC\_<\_X2$$

in which X2 represents a maximum value of a target point, the protection function being deactivated as soon as said first and second conditions are simultaneously met.

3. The method as claimed in claim 1, wherein the step of calculating includes the substeps comprising:
   calculating a first distance D1 defined in the horizontal plane along the longitudinal axis of the landing strip and representing a minimum distance for which the protection function must be deactivated for an aligned flight;
   calculating a second distance D2 defined in the horizontal plane along the longitudinal axis of the landing strip and representing a distance required for the aircraft for directing its flight path toward the target point, from its current position and the current heading deviation;
   calculating a third distance D3 defined in the horizontal plane along the longitudinal axis of the landing strip and representing a distance required for the aircraft to be aligned in the axis of the landing strip with a close margin; and calculating the current longitudinal distance D4 from these first, second and third distances, using the following expression, in which max represents the maximum value:

$$D4 = \max[0; D1 - (D2 + D3)].$$

4. The method as claimed in claim 3, wherein the substep of calculating the first distance comprises calculating the first distance D1 using the following expression:

$$D1 = (k1 \cdot Z0 - k2) \cdot k3$$

in which:
k1 is a predetermined margin;
k2 and k3 are predetermined parameters; and
Z0 is a lowest height at which the aircraft can fly if the protection function is engaged.

5. The method as claimed in claim 3, wherein the substep of calculating the second distance comprises calculating the second distance D2 using the following expression:

$$D2 = V^2/(g \cdot tg(\phi 0)) \cdot |\sin(\Delta\chi) - \sin(\Delta\chi 1)|$$

in which:
V is the speed of the aircraft (AC);
g is the acceleration of gravity;
tg is the tangent and sin the sine;
φ0 is a maximum bank angle of the aircraft;
Δχ is the current heading deviation of the aircraft with respect to the landing strip; and
Δχ1 is a heading deviation between the landing strip and a straight line passing through the current position of the aircraft and the target position.

6. The method as claimed in claim 5, wherein the heading deviation .DELTA..chi.1 between the landing strip and the straight line passing through the current position of the aircraft and the target position, is calculated using the following expressions:

$$\Delta\chi 1 = \text{arc } tg(YAC/(XTGT - XAC)) \text{ if } (XTGT - XAC)\_<\_0;$$

$$\Delta\chi 1 = 180 + \text{arc } tg(YAC/(XTGT - XAC)) \text{ if } (XTGT - XAC)\_<\_0 \text{ and } YAC\_>\_0;$$

$$\Delta\chi 1 = -180 + \text{arc } tg(YAC/(XTGT - XAC)) \text{ if } (XTGT - XAC)\_<\_0 \text{ and } YAC\_<\_0, \text{ in which:}$$

arc tg is the arc tangent; and
YAC illustrates a lateral coordinate of the current position of the aircraft in the horizontal plane.

7. The method as claimed in claim 3, wherein the substep of calculating the third distance comprises calculating the third distance D3 using the following expression:

$$D3 = \max[0; V^2/(g \cdot tg(\phi 0)) \cdot (\sin(|\Delta\chi 1|) - \sin(\Delta\chi 0))]$$

in which:
V is the speed of the aircraft;
g is the acceleration of gravity;
tg is the tangent and sin the sine;
φ0 is a maximum bank angle of the aircraft;
Δχ1 is a heading deviation between the landing strip and a straight line passing through the current position of the aircraft and the target position; and
Δχ0 is a maximum heading deviation with respect to the landing strip for being able to perform a safe landing.

8. The method as claimed in claim 1, further comprising an additional step comprising calculating the longitudinal coordinate XTGT of the target position so that:
this longitudinal coordinate XTGT of the target position is initially equal to the longitudinal coordinate X1 of the target point, as long as the longitudinal coordinate X1 of the target point remains greater than the sum of the longitudinal coordinate XAC of the current position of the aircraft and a predetermined minimum distance X min;
then, the longitudinal coordinate XTGT of the target position is equal to the sum of the longitudinal coordinate XAC of the current position of the aircraft and the minimum distance X min, as long as this longitudinal coordinate XTGT remains less than a predetermined maximum longitudinal coordinate X2.

9. A device for automatic protection of an aircraft against a risk of collision with the ground, said device comprising:
at least one main unit configured for implementing on the aircraft at least one protection function that prevents the aircraft from flying under a given height with respect to the ground, said main unit including an activation/deactivation element capable of activating and deactivating said protection function,
a data generation unit configured for determining the current values of parameters related to the flight of the aircraft, namely at least the current position of the aircraft and a current heading deviation of the aircraft with respect to a landing strip;
a calculation unit configured for calculating, during a landing on the landing strip, from data including said current values and at least one target point, a current longitudinal distance defined in the horizontal plane and necessary for bringing the aircraft into a position for deactivating the protection function; and
a checking unit configured for checking whether at least the following first condition is met:

$$XAC + D4 \cdot \text{sign}(\cos(\Delta\chi))\_>\_XTGT$$

in which:
XAC illustrates a longitudinal coordinate of the current position of the aircraft, this longitudinal coordinate having a negative value and being defined along a longitudinal axis of the landing strip in the horizontal plane, with respect to a reference point;
sign represents the sign;
D4 is the current longitudinal distance,
Δχ is the current heading deviation of the aircraft with respect to the landing strip; and
XTGT is a longitudinal coordinate of a target position dependent on said target point,
the activation/deactivation element being configured for deactivating said protection function if the checking unit concludes that at least said first condition is met.

10. An aircraft comprising a device for automatic protection of an aircraft against a risk of collision with the ground, said device comprising:
at least one main unit configured for implementing on the aircraft at least one protection function that prevents the aircraft from flying under a given height with respect to the ground, said main unit including an activation/deactivation element capable of activating and deactivating said protection function,
a data generation unit configured for determining the current values of parameters related to the flight of the aircraft, namely at least the current position of the aircraft and a current heading deviation of the aircraft with respect to a landing strip;
a calculation unit configured for calculating, during a landing on the landing strip, from data including said current values and at least one target point, a current longitudinal distance defined in the horizontal plane and necessary for bringing the aircraft into a position for deactivating the protection function; and a checking unit configured for checking whether at least the following first condition is met:

$$XAC + D4 \cdot \text{sign}(\cos(\Delta\chi))\_>\_XTGT \quad (5)$$

in which:

XAC illustrates a longitudinal coordinate of the current position of the aircraft, this longitudinal coordinate having a negative value and being defined along a longitudinal axis of the landing strip in the horizontal plane, with respect to a reference point;

sign represents the sign;

D4 is the current longitudinal distance, $\Delta\chi$ is the current heading deviation of the aircraft with respect to the landing strip; and XTGT is a longitudinal coordinate of a target position dependent on said target point, the activation/deactivation element being configured for deactivating said protection function if the checking unit concludes that at least said first condition is met.

\* \* \* \* \*